(12) United States Patent
Gurka et al.

(10) Patent No.: US 6,527,448 B1
(45) Date of Patent: Mar. 4, 2003

(54) ASYMMETRIC ANGULAR CONTACT BEARING

(75) Inventors: Jiri Gurka, Behamberg (AT); Alfred Moser, Steyr (AT); Ferdinand Schweitzer, St. Peter (AT); Manfred Antensteiner, Sierning (AT); Clair Druet, Drumettaz Clarafond (FR); Thomas Fucks, Röthlein (DE); Hendrikus Jan Kapaan, Nieuwegein (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/806,459

(22) PCT Filed: Oct. 13, 1999

(86) PCT No.: PCT/NL99/00632

§ 371 (c)(1),
(2), (4) Date: Jun. 21, 2001

(87) PCT Pub. No.: WO00/22310

PCT Pub. Date: Apr. 20, 2000

(30) Foreign Application Priority Data

Oct. 13, 1998 (NL) .............................................. 1010310

(51) Int. Cl.[7] .............................................. F16C 33/58
(52) U.S. Cl. ........................ 384/513; 384/515; 384/539
(58) Field of Search ........................... 74/89.23, 424.81; 384/513, 515, 516, 539

(56) References Cited

U.S. PATENT DOCUMENTS

| | | | |
|---|---|---|---|
| 1,360,430 A | 11/1920 | Miller | |
| 1,371,090 A | * 3/1921 | Hess | 384/515 |
| 1,970,449 A | 8/1934 | Gibbons | |
| 2,316,449 A | * 4/1943 | Parker | 384/516 |
| 4,707,151 A | 11/1987 | Kaiser | 384/495 |
| 4,939,946 A | * 7/1990 | Teramachi | 74/89.3 |
| 5,127,285 A | * 7/1992 | Granhom | 74/527 |
| 5,284,394 A | 2/1994 | Lemelson | |
| 5,632,561 A | * 5/1997 | Chi | 384/515 |

FOREIGN PATENT DOCUMENTS

| | | |
|---|---|---|
| AU | 495059 B | 3/1976 |
| DE | 1303659 B | 6/1972 |
| DE | 3046812 A | 7/1982 |
| DE | 4324838 A | 1/1995 |
| EP | 50213 A | 4/1982 |
| EP | 691483 A | 1/1996 |
| FR | 1156112 A | 5/1958 |
| FR | 1581781 A | 9/1969 |
| WO | WO 9015936 A | 12/1990 |

* cited by examiner

Primary Examiner—Thomas R. Hannon
(74) Attorney, Agent, or Firm—Oliff & Berridge, PLC

(57) ABSTRACT

An asymmetric angular contact bearing comprises an inner ring (2) and an outer ring (3) each defining a raceway, at least one ring being provided with a high shoulder (6) and a low shoulder (7) which border the raceway of said ring, as well as a series of rolling elements (8) which are in rolling contact with the raceways. The low shoulder is provided with a circumferential groove (9), a ring member (10) being accommodated in said groove (9) for contacting the rolling elements (8).

11 Claims, 1 Drawing Sheet

ASYMMETRIC ANGULAR CONTACT BEARING

The invention is related to an asymmetric angular contact bearing, comprising an inner ring and an outer ring each defining a raceway, at least one ring being provided with a high shoulder and a low shoulder which border the raceway of said ring, as well as a series of rolling elements which are in rolling contact with the raceways.

Such bearing, e.g. a ball bearing, roller bearing or cross roller bearing, is generally known. The different contact angles of its asymmetric contact lines make the bearing suitable for carrying relatively high axial loads in one direction.

This property is of importance for specific applications of the bearing, in which the main axial loading always has the same direction. Examples of such application are screw actuators, used in for instance brake callipers for brake discs. In such cases, the main axial loading concerned is related to the displacement of the brake pads onto the brake disc. The opposite displacement is for relieving the braking action between brake pads and brake disc, and gives rise to loadings of a much lower magnitude.

Another example is the application of such bearing in a clutch.

The object of tile invention is to provide an asymmetric angular contact bearing, which is more versatile as to assembling and layout and can be produced at lower cost (no split rings). This object is achieved in that the low shoulder is provided with a circumferential groove, a ring member being accommodated in said groove or contacting the rolling elements.

The asymmetric angular contact bearing according to the invention has, as is the case with prior art angular contact bearings, two contact points between each rolling element and each of the rings, which accumulates to a total of four contact points for each ball. Thus, the rings on the one hand, and each rolling element on the other hand engage each other at four contact points, two contact lines being defined by the two pairs of diametrically opposite contact points, one of said contact lines defining a contact angle with respect to the axis of the bearing which is relatively small, and the other contact line defining a contact angle with respect to the axis of the bearing which is relatively large.

Distinct from the prior art bearings, one of said contact points of each ball is constituted by the ring clement according to the invention. The ring element provides several advantages concerning assembling and lay-out of the bearing, which will be addressed in the following.

Rolling element bearings having ring elements or ring-shaped inserts are known per se. GB-A-1007191 discloses a bearing having a total of four ring elements, each constituting one of the contact points of a rolling element. However, said prior art bearing is not an asymmetric angular contact bearing, nor do the rings thereof have a high shoulder and a low shoulder. Said bearing is not fit for relatively high axial loading.

A further example of a prior art rolling element bearing is disclosed in EP-A-245593. This bearing neither is an asymmetric angular contact bearing, nor do its rings have a high shoulder and a low shoulder. The bearing in question may be carried out as a radial ball bearing or as a cross roller bearing.

In order to obtain the desired axial load bearing capacity, the bearing according to the invention is carried out in such a way that one contact line is defined by the contact point of the ring member and a rolling element, and by the contact point of the shoulder diametrically opposite to said ring member and said rolling element, said contact line having a relatively large contact angle.

The main axial load is to be carried by the shoulders which define the other contact line, which has a relative small contact angle.

Preferably, the low shoulder, which is provided with a groove, has an internal cylindrical surface the diameter of which is equal to the maximal diameter of the raceway. This embodiment has the advantage of an easy and straightforward assembly. This advantage offers the possibility to assemble the bearing as a full complement bearing, wherein the available bearing space between the rings is fully occupied by rolling elements, without a cage. The balls are put into place by simply sliding them past the low shoulder, after which they are secured by means of the lock ring member.

The low shoulder may be equipped with a seal or shield. The pair of shoulders opposite the pair of shoulders one of which has a ring member, enclose a gap defining a labyrinth seal. Sealing can also take place with a seal or shield.

The ring member may have a generally round or circular cross section. Alternatively, the ring member at its surface part facing the rolling elements, may at least partly be conformed to the shape of said rolling elements.

The invention is also related to a screw actuator, comprising a screw mechanism, a housing with or without a gear reduction and an asymmetric bearing as described before, comprising an inner ring and an outer ring each defining a raceway, at least one ring being provided with a high shoulder and a low shoulder which border the raceway of said ring, as well as a series of rolling elements which are in rolling contact with the raceways, said bearing supporting one of the nut and screw of the screw mechanism with respect to the housing, the outer ring of the bearing engaging the screw of the screw mechanism.

The bearing according to the invention may in particular be applied in such screw actuator, as explained before, in case said actuator is mainly exposed to axial loadings in one and the same direction, e.g. as applied in a brake calliper for a disc brake. To that end, the low shoulder of the bearing is provided with a circumferential groove, a ring member being accommodated in said groove for contacting the rolling elements.

In a particular embodiment, the inner ring of the bearing may engage, or may be integrated in, a central support shaft connected to the housing of the actuator.

Preferably, the screw mechanism is a roller or ball screw, the nut of which is carried out as a sleeve or piston which is slidably but non-rotatably accommodated in a cylinder space in the housing.

According to a further possibility, the bearing according to the invention may be applied in a screw actuator, comprising a screw mechanism, a housing and an asymmetric bearing, comprising an inner ring and an outer ring each defining a raceway, at least one ring being provided with a high shoulder and a low shoulder which border the raceway of said ring, as well as a series of rolling elements which are in rolling contact with the raceways, said bearing supporting one of the nut and screw of the screw mechanism with respect to the housing, the inner ring of the bearing engaging the nut of the screw mechanism.

Here as well, the low shoulder is provided with a circumferential groove, a ring member being accommodated in said groove for contacting the rolling elements.

Preferably, the outer ring is supported with respect to the housing, and the screw is axially displaceable, but non-rotatable.

The invention will now be explained further with reference to the embodiments shown in the figures.

Figure 1:
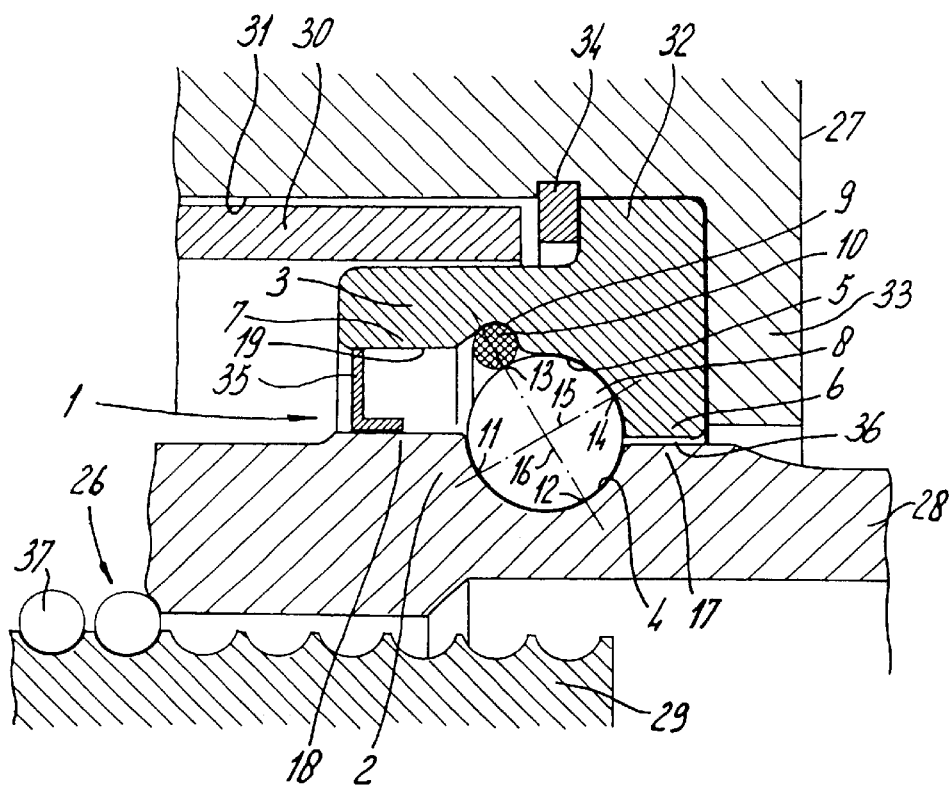
FIG. 1 shows a first embodiment of a screw actuator comprising a bearing according to the invention.

The screw actuator, part of which is shown in FIG. 1, comprises a screw actuator 26 which by means of bearing 1 is supported in a housing 27. The screw actuator 26 comprises in particular a rotatable, but axially non-displaceable held nut 28, and an axial displaceable, but not-rotatable screw 29.

The nut 28 and screw 29 engage each other by means of balls 37, accommodated in appropriated screw windings in the nut 28 and screw 29.

The nut 28 is connected to a drive (not shown), and is integrated with the inner ring 2 of the bearing 1. The outer ring 3 of said bearing has a flange 32 which is held captive in the housing 27 between the breast 33 and the clipring 34.

Furthermore, the screw 29 is connected to a slidable but non-rotatable piston 30, which is held in cylinder space 31 in the housing 27.

The outer ring 3 of the bearing 1 has a high shoulder 6 and a low shoulder 7, in which low shoulder 7 a groove 9 has been applied accommodating a lock ring 10.

As a result of this layout, the four contact point 11–14 define asymmetric contact lines 15, 16. The contact line 15, between the contact points 11 and 14, has a relatively small angle with respect to the axis of the screw mechanism 26, in such a way that the bearing 1 is able to transfer axial compressive forces which are exerted on the left end of the screw 29.

The lock ring 10 holds the rolling elements, or balls 8, captive within the bearing 1 between the nut 28 along ring surface 4 and the outer ring 3 along ring surface 5. In this direction, the bearing 1 is not loaded to a significant degree. In case the actuator in question is used as an actuator for a disc-brake, the main axial loadings are constituted by the compressive forces on the screw 29 as addressed above. The forces in the opposite direction, which are to transferred via contact line 16 defined between contact points 12, 13 is only for releasing the brake and are of a lower magnitude.

Between the high shoulder 6 of the outer ring 3, and the shoulder 17 of the inner ring 2 a gap 36 is available which constitutes a labyrinth seal. The larger gap between the low shoulder 7 along inward surface 19 and the shoulder 18 is closed by means of a seal or shield 35.

Figure 2:
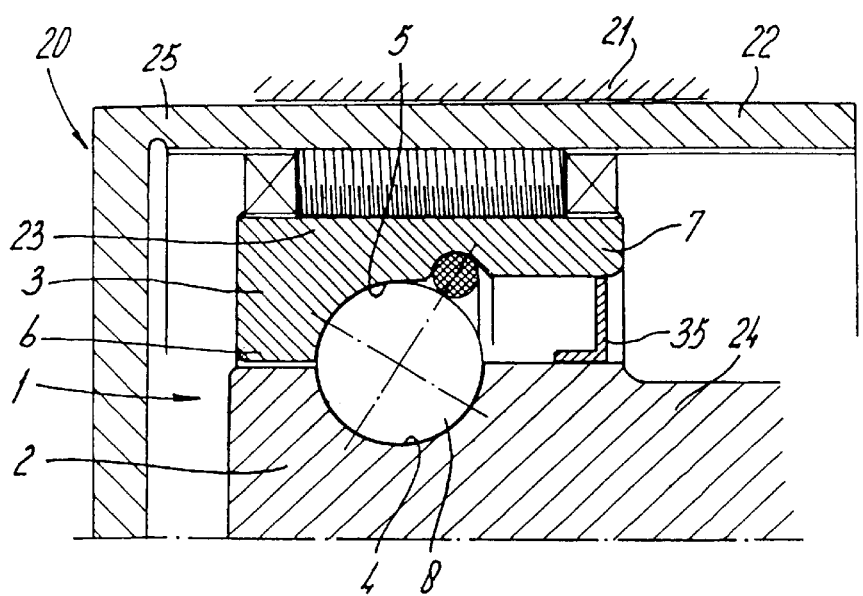
FIG. 2 shows a second embodiment.

The embodiment of FIG. 2 comprises a similar bearing 1, the inner ring 2 of which now however being integrated in a central support shaft 24 which is connected to the housing 21. The outer ring 3 is integrated with the screw 23 of the screw mechanism 20. Said screw mechanism 20 furthermore comprises a nut 22, carried out as a piston 25 which is slidably but non rotatably held in tile housing 21. The main components of bearing 1 are similar to the bearing 1 in FIG. 1.

What is claimed is:

1. Asymmetric angular contact bearing, comprising an inner ring and an outer ring each defining a raceway, at least one ring being provided with a high shoulder and a low shoulder which border the raceway of said ring, as well as a series of rolling elements which are in rolling contact with the raceways, wherein the low shoulder is provided with a circumferential groove, a ring member being accommodated in said groove for contacting the rolling elements.

2. Bearing according to claim 1, wherein the rings on the one hand, and each rolling element on the other hand engage each other at four contact points, two contact lines being defined by the two pairs of diametrically opposite contact points, one of said contact lines defining a contact angle with respect to the axis of the bearing which is relatively small, and the other contact line defining a contact angle with respect to the axis of the bearing which is relatively large.

3. Bearing according to claim 2, wherein the bearing is a full complement bearing.

4. Bearing according to claim 1, wherein one contact line is defined by the contact point of the ring member and a rolling element, and by the contact point of the shoulder diametrically opposite to said ring member and said rolling element, said contact line having a relatively large contact angle.

5. Bearing according to claim 4, wherein the rolling elements are balls.

6. Bearing according to claim 1, wherein the low shoulder, which is provided with a groove, has an internal cylindrical surface the diameter of which is equal to the maximal diameter of the raceway.

7. Bearing according to claim 6, wherein the low and/or high shoulder is provided with a seal or shield.

8. Bearing according to claim 1, wherein the ring member is a split lock ring.

9. Bearing according to claim 8, wherein the pair shoulders opposite the pair shoulders one of which has a ring member, enclose a gap defining a labyrinth seal.

10. Bearing according to claim 1, wherein one of the rings has a high and a low shoulder, said low shoulder being provided with a groove containing a ring member, and the other ring has equal shoulders.

11. Bearing according to claim 1, wherein one of the rings is provided with a circumferential groove containing a ring member, and the other ring is a two-part ring.

* * * * *